(12) United States Patent
Yang et al.

(10) Patent No.: US 11,495,933 B2
(45) Date of Patent: Nov. 8, 2022

(54) ASSEMBLY SYSTEM

(71) Applicants: Tyco Electronics (Shanghai) Co. Ltd., Shanghai (CN); TE Connectivity Services GmbH, Schaffhausen (CH); Kunshan League Automechanism Co., Ltd., Kunshan (CN)

(72) Inventors: An Yang, Shanghai (CN); Lvhai Hu, Shanghai (CN); Roberto Francisco-Yi Lu, Bellevue, WA (US); Jian Cao, Shanghai (CN); Yun Liu, Shanghai (CN); Yuting He, Kunshan (CN); Haidong Wu, Kunshan (CN)

(73) Assignees: Tyco Electronics (Shanghai) Co. Ltd., Shanghai (CN); Kunshan League Automechanism Co., Ltd., Kunshan (CN); TE Connectivity Solutions GmbH, Schaffhausen (CH)

( * ) Notice: Subject to any disclaimer, the term of this patent is extended or adjusted under 35 U.S.C. 154(b) by 0 days.

(21) Appl. No.: 17/154,204

(22) Filed: Jan. 21, 2021

(65) Prior Publication Data
US 2021/0226399 A1    Jul. 22, 2021

(30) Foreign Application Priority Data
Jan. 22, 2020    (CN) .......................... 202020144721.0

(51) Int. Cl.
*H01R 43/16*    (2006.01)
*B65G 15/30*    (2006.01)

(52) U.S. Cl.
CPC ............. *H01R 43/16* (2013.01); *B65G 15/30* (2013.01)

(58) Field of Classification Search
CPC .... H01R 43/16; H01R 43/052; H01R 43/055; B65G 15/30; B30B 15/146; Y10T 29/49174; Y10T 29/49185; Y10T 29/53209; Y10T 29/53235; Y10T 29/53261
USPC .......................................... 29/747, 753, 759
See application file for complete search history.

(56) References Cited

U.S. PATENT DOCUMENTS

| | | | | |
|---|---|---|---|---|
| 4,850,905 | A * | 7/1989 | Capp .................... | H01R 43/055 29/863 |
| 5,131,124 | A * | 7/1992 | Skotek ................. | H01R 43/055 29/33 M |
| 6,067,828 | A * | 5/2000 | Bucher ................. | B30B 15/146 29/751 |
| 9,793,671 | B2 * | 10/2017 | Schuetz ............... | H01R 43/052 |

* cited by examiner

*Primary Examiner* — Donghai D Nguyen
(74) *Attorney, Agent, or Firm* — Barley Snyder

(57) ABSTRACT

An assembly system includes a positioning unit adapted to clamp and position a cable, a supply unit adapted to supply a connector, and an insertion unit adapted to insert an end of the cable into the connector by moving the connector. The supply unit includes a conveyor belt having a side to which ends of a plurality of connectors in a row of connectors are connected, a cutting device configured to cut each connector of the row of connectors from the conveyor belt, and a conveyor configured to move the conveyor belt, so as to move the connectors individually to the cutting device.

18 Claims, 5 Drawing Sheets

ASSEMBLY SYSTEM

CROSS-REFERENCE TO RELATED APPLICATION

This application claims the benefit of the filing date under 35 U.S.C. § 119(a)-(d) of Chinese Patent Application No. 202020144721.0, filed on Jan. 22, 2020.

FIELD OF THE INVENTION

The present invention relates to an assembly system and, more particularly, to an assembly system adapted to insert an end of a cable into a connector.

BACKGROUND

In the prior art, the processed end of a cable is usually inserted into the connector manually, so that the end conductor of the cable is electrically connected to the conductive terminal in the connector. However, the efficiency and quality of using this manual method to insert the cable into the connector are very low.

SUMMARY

An assembly system includes a positioning unit adapted to clamp and position a cable, a supply unit adapted to supply a connector, and an insertion unit adapted to insert an end of the cable into the connector by moving the connector. The supply unit includes a conveyor belt having a side to which ends of a plurality of connectors in a row of connectors are connected, a cutting device configured to cut each connector of the row of connectors from the conveyor belt, and a conveyor configured to move the conveyor belt, so as to move the connectors individually to the cutting device.

BRIEF DESCRIPTION OF THE DRAWINGS

The invention will now be described by way of example with reference to the accompanying Figures, of which.

DETAILED DESCRIPTION OF THE EMBODIMENTS

Figure 1:
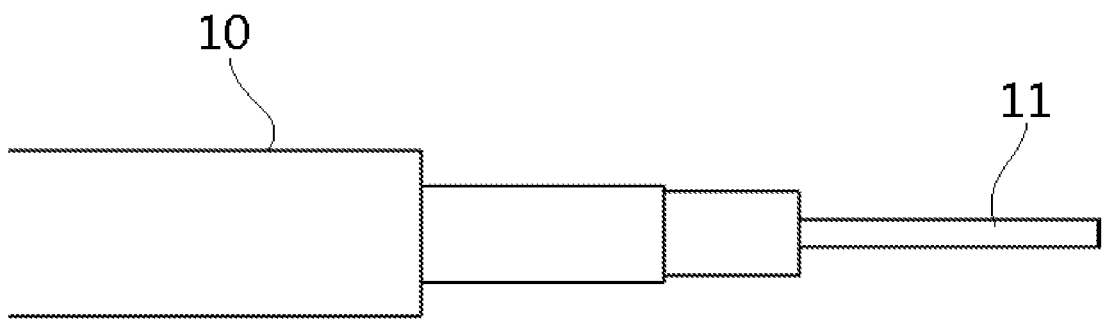
FIG. 1 is a schematic side view of a cable according to an embodiment.

The technical scheme of the disclosure is further described in detail by the following embodiments with reference to the accompanying drawings. In the specification, the same or similar reference numerals denote the same or similar components. The following description of the embodiments of the present disclosure with reference to the accompanying drawings is intended to explain the general inventive concept of the disclosure and should not be construed as a limitation of the present disclosure.

In addition, in the following detailed description, for purposes of explanation, numerous specific details are set forth in order to provide a thorough understanding of the embodiments of the disclosure. However, it may be evident, that one or more embodiments may be practiced without these specific details. In other instances, well-known structures and devices are shown in schematic form in order to simplify the drawing.

Figure 2:
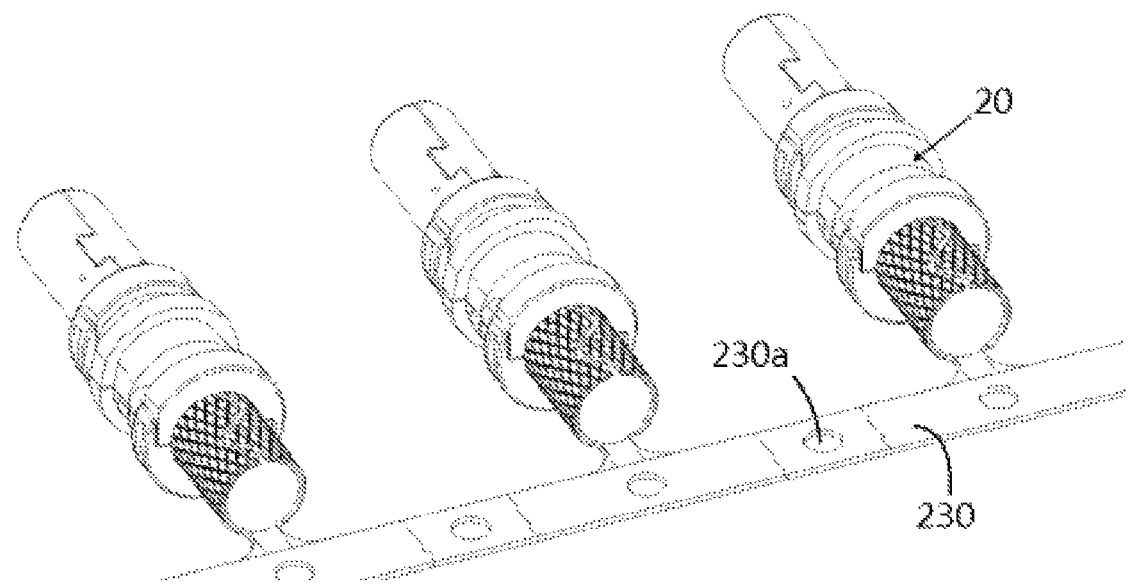
FIG. 2 is a perspective view of a conveyor belt and a row of connectors connected to the conveyor belt according to an embodiment.
Figure 3:
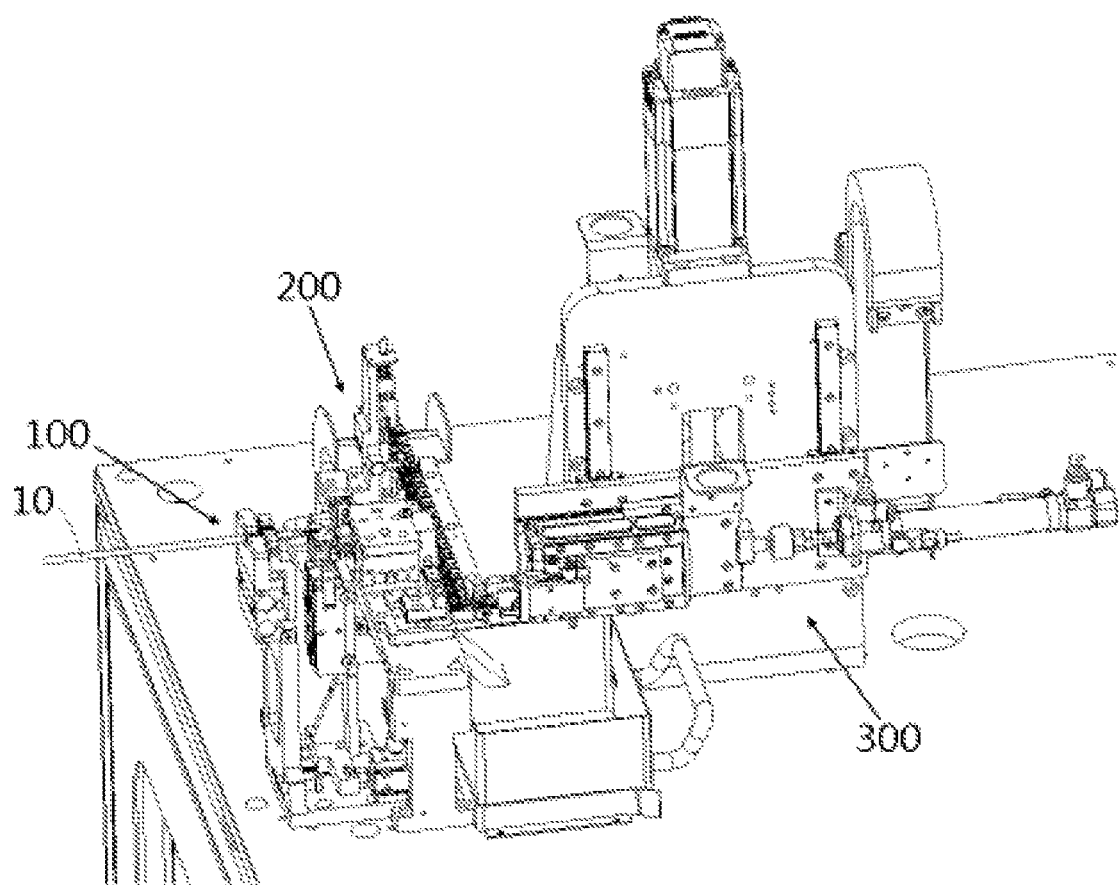
FIG. 3 is a perspective view of an assembly system according to an embodiment.

An assembly system according to an embodiment is shown in FIG. 3. The assembly system comprises a positioning unit 100, a supply unit 200, and an insertion unit 300. The positioning unit 100 is adapted to clamp and position a cable 10. The supply unit 200 is adapted to supply a connector 20, shown in FIG. 2. The insertion unit 300 is adapted to automatically insert an end 11 of the cable 10, shown in FIG. 1, into the connector 20 by moving the connector 20.

Figure 5:
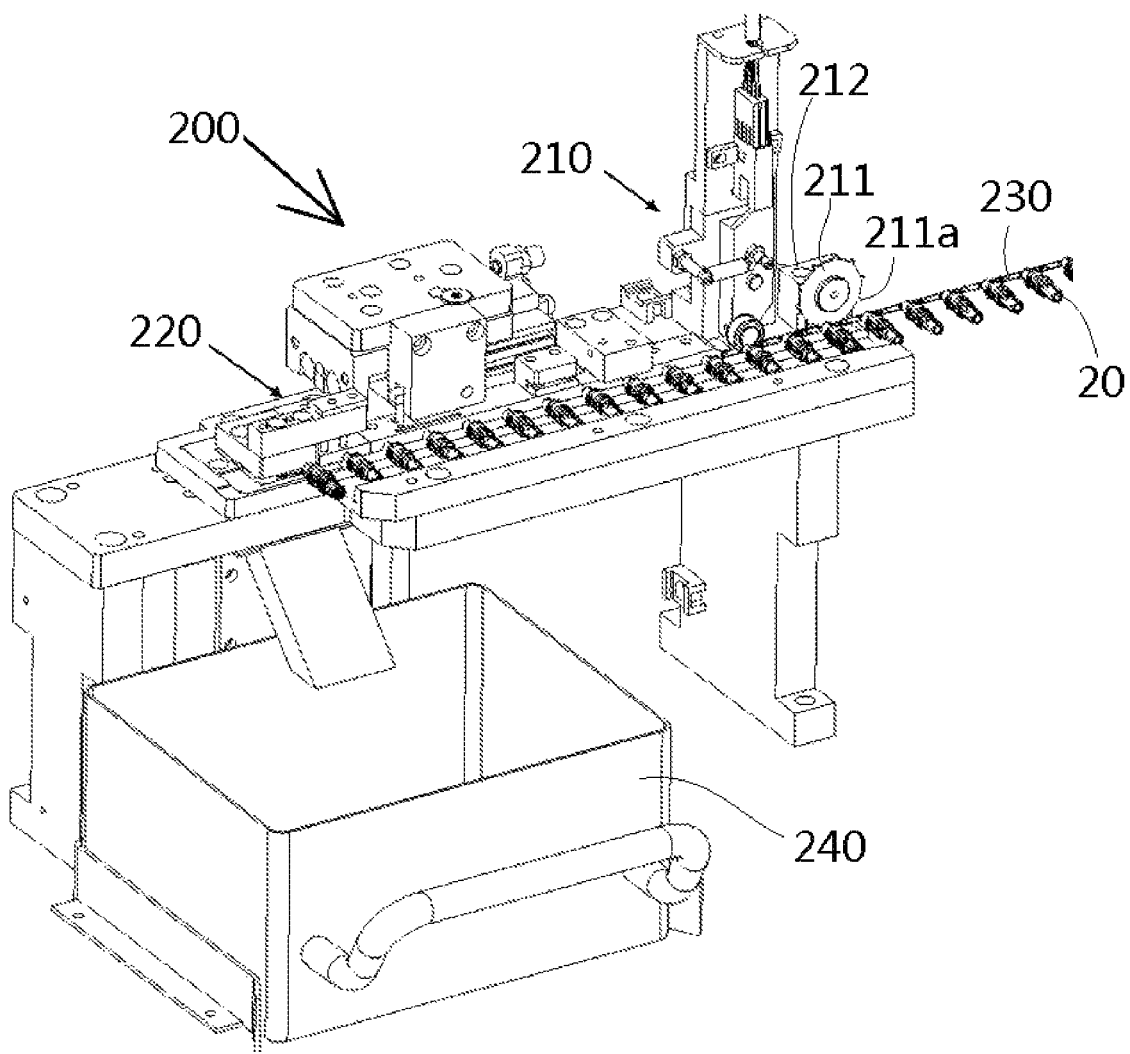
FIG. 5 is a perspective view of a supply unit of the assembly system.

As shown in FIGS. 3 and 5, in the illustrated embodiment, the supply unit 200 includes a conveyor belt 230, a cutting device 220, and a conveyor 210. A first end of each of the connectors 20 in a row of connectors 20 are connected to one side of the conveyor belt 230, as shown in FIGS. 2 and 5. The cutting device 220 is configured to cut the connector 20 from the conveyor belt 230. The conveyor 210 is configured to move the conveyor belt 230 so as to move the connectors 20 individually to the cutting device 220.

Figure 4:
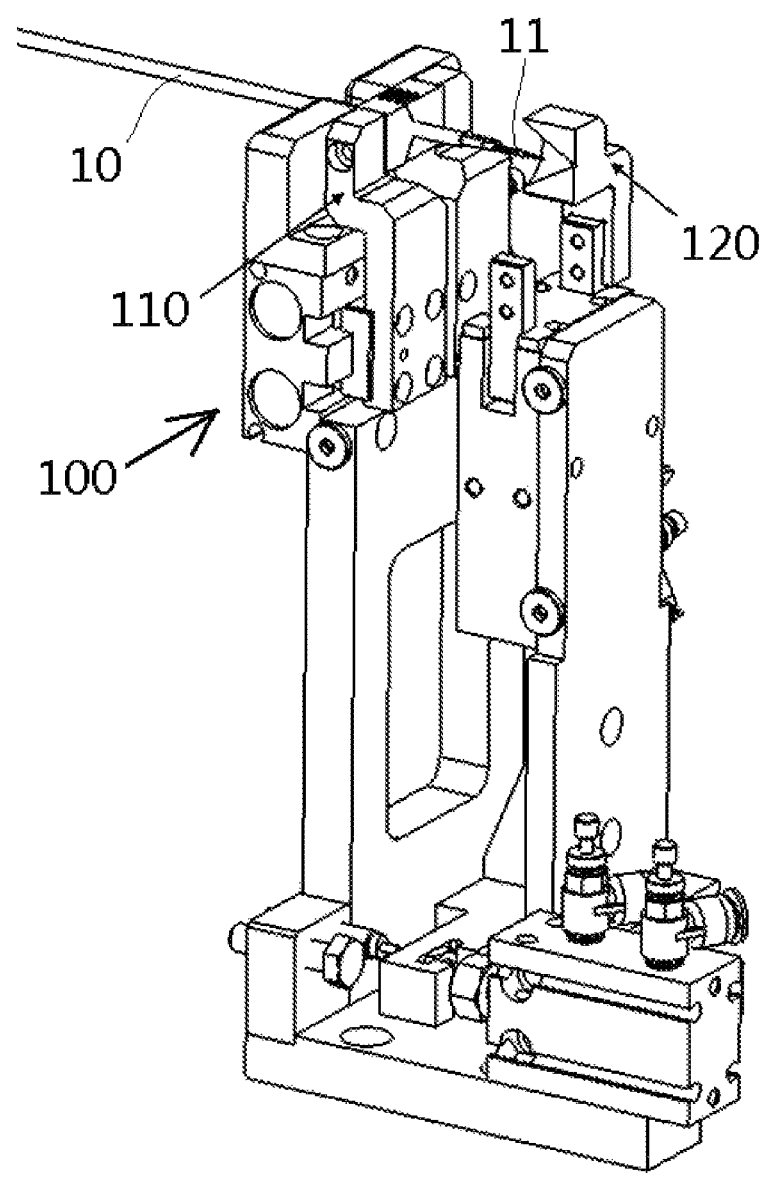
FIG. 4 is a perspective view of a positioning unit of the assembly system.

The positioning unit 100, as shown in FIGS. 3 and 4, includes a fixing fixture 110 and a straightening fixture 120. The fixing fixture 110 is configured to clamp and fix the cable 10. The straightening fixture 120 is configured to correct the straightness of the end 11 of the cable 10, so that the end 11 of the cable 10 remains straight. In an embodiment, the positioning unit 100 further comprises a sensor, which may be installed on the fixing fixture 110 for detecting whether the cable 10 is placed in the fixing fixture 110. The fixing fixture 110 is controlled by a controller to automatically close to clamp the cable 10 when the sensor detects that a cable 10 is already placed in the fixing fixture 110.

The conveyer 210, as shown in FIG. 5, includes a gear disk 211 and a driving device 212 configured to drive the gear disk 211 to rotate. A row of positioning holes 230*a* are formed on the conveyor belt 230, as shown in FIG. 2, and the gear teeth 211*a* on the gear disk 211 are configured to mesh with the positioning holes 230*a* on the conveyor belt 230 so that the conveyor belt 230 may be pushed to move by rotating the gear disk 211. In the shown embodiment, the conveyor 210 is configured to drive the conveyor belt 230 to move in a horizontal direction perpendicular to the axis of the cable 10 fixed on the positioning unit 100.

The supply unit 200, as shown in FIG. 5, includes a waste recovery box 240, which is provided under the cutting device 220 and is configured to recover the waste generated during cutting.

Figure 6:
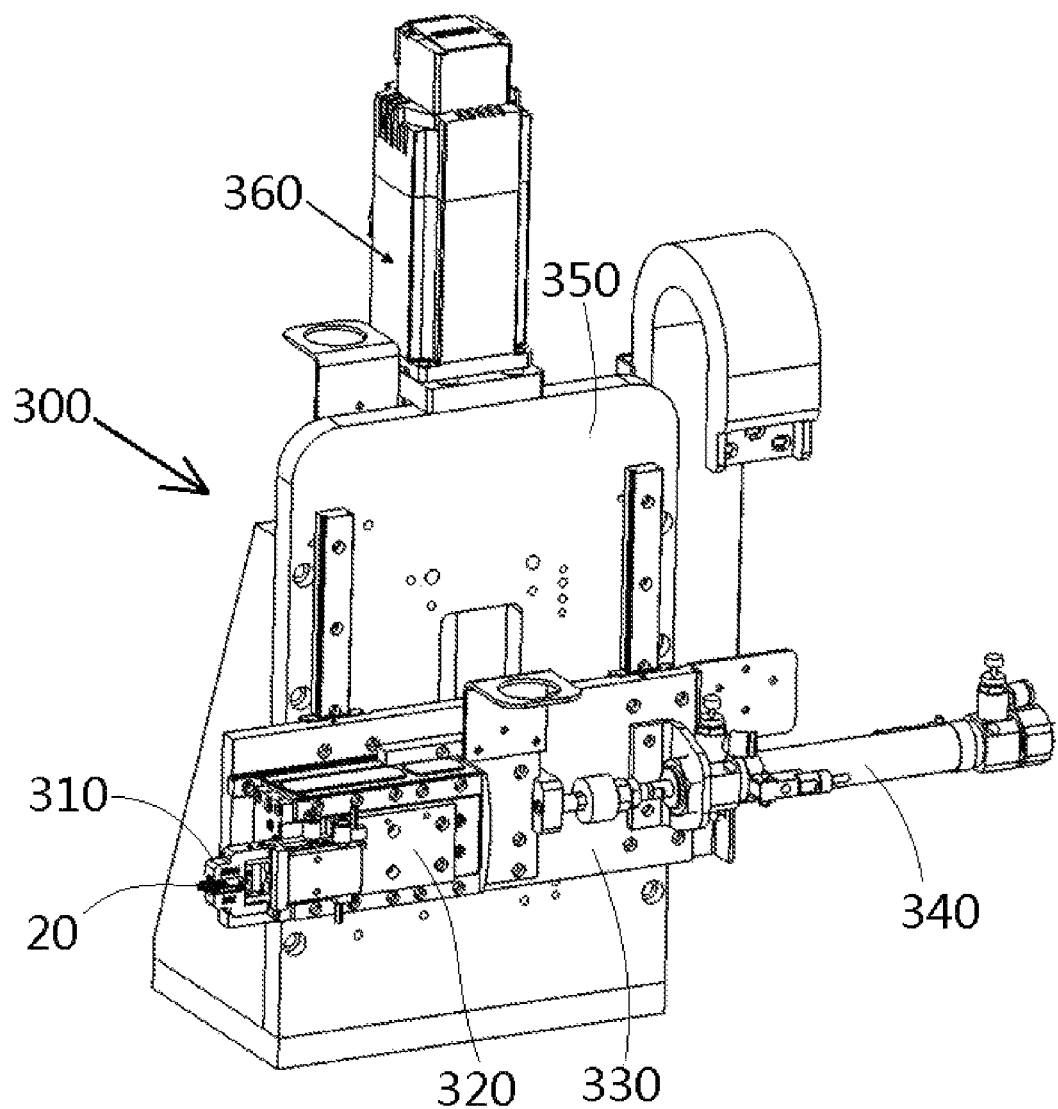
FIG. 6 is a perspective view of an insertion unit of the assembly system.

As shown in FIGS. 1 and 6, in the illustrated embodiment, the insertion unit 300 includes a gripper 310 and an insertion device 320. The gripper 310 is configured to grip the connector 20 cut from the conveyor belt 230. The insertion device 320 is configured to move the gripper 310 in a horizontal direction parallel to the axis of the cable 10. The gripper 310 is installed on the insertion device 320, and the insertion device 320 is configured to insert the end 11 of the cable 10 into the gripped connector 20 by moving the gripper 310.

In an embodiment, the insertion unit 300 further comprises a force sensor installed on the insertion device 320 and configured to detect an insertion force when the cable 10 is inserted. The insertion device 320 may be controlled by the controller to stop the insertion operation when the insertion force detected by the force sensor is greater than a predetermined maximum insertion force or less than a predetermined minimum insertion force.

As shown in FIGS. 1 and 6, in the illustrated embodiment, the insertion unit 300 includes a first mounting plate 330 and a cylinder 340. The insertion device 320 is slidably mounted on the first mounting plate 330 and able to slide in a horizontal direction parallel to the axis of the cable 10. The cylinder 340 is fixed on the first mounting plate 330 and connected with the insertion device 320. The cylinder 340 is configured to drive the insertion device 320 to move on the first mounting plate 330 in a horizontal direction parallel to the axis of the cable 10, so as to adjust the position of the insertion device 320 in the horizontal direction.

As shown in FIGS. 1 and 6, in the illustrated embodiment, the insertion unit 300 further comprises a second mounting plate 350 and a driving device 360. The first mounting plate 330 is slidably mounted on the second mounting plate 350 and able to slide in a vertical direction perpendicular to the axis of the cable 10. The driving device 360 is fixed on the second mounting plate 350 for driving the first mounting plate 330 to move in a vertical direction perpendicular to the axis of the cable 10, so as to adjust the position of the insertion device 320 in the vertical direction.

In each of the foregoing exemplary embodiments according to the present disclosure, the assembly system can automatically insert the end 11 of the cable 10 into the connector 20, which improves the efficiency and quality of inserting the end 11 of the cable 10 into the connector 20.

Those skilled in the art will appreciate that the above-described embodiments are illustrative and can be modified by those skilled in the art, and that the structures described in the various embodiments can be freely combined without conflict in structure or principle. Although the present disclosure has been described with reference to the accompanying drawings, the embodiments disclosed in the drawings are intended to be illustrative explanations of embodiments of the disclosure, and should not be construed as limiting the disclosure. Although a few embodiments of the present general inventive concept have been shown and described, it would be appreciated by those skilled in the art that changes may be made in these embodiments without departing from the principles and spirit of the present general inventive concept, and the scope of the present disclosure is defined by the claims and their equivalents.

What is claimed is:

1. An assembly system, comprising:
a positioning unit configured to clamp and position a cable;
a supply unit including a conveyor belt having a side to which ends of a plurality of connectors in a row of connectors are connected, a cutting device configured to cut each connector of the row of connectors from the conveyor belt, and a conveyor configured to move the conveyor belt, so as to move the connectors to the cutting device; and
an insertion unit configured to insert an end of the cable into one of the connectors by moving the one connector, including:
a gripper configured to grip the one connector cut from the conveyor belt;
an insertion device configured to move the gripper in a horizontal direction parallel to an axis of the cable for inserting the end of the cable into the one connector, the gripper installed on the insertion device;
a first mounting base on which the insertion device is movable in a first direction; and
a second mounting base on which the first mounting base is movable in a second direction, distinct from the first direction.

2. The assembly system of claim 1, wherein the positioning unit includes a fixing fixture configured to clamp and fix the cable.

3. The assembly system of claim 2, wherein the positioning unit includes a straightening fixture configured to straighten the end of the cable.

4. The assembly system of claim 3, wherein the positioning unit includes a sensor installed on the fixing fixture for detecting whether the cable is placed in the fixing fixture, the fixing fixture is controlled to automatically close to clamp the cable when the sensor detects that the cable is placed in the fixing fixture.

5. The assembly system of claim 1, wherein the conveyor includes a gear disk and a driving device configured to drive the gear disk to rotate.

6. The assembly system of claim 5, wherein a row of positioning holes are formed on the conveyor belt, a plurality of gear teeth on the gear disk are configured to mesh with the positioning holes on the conveyor belt so that the conveyor belt is pushed to move by rotating the gear disk.

7. The assembly system of claim 6, wherein the conveyor is configured to drive the conveyor belt to move in a horizontal direction perpendicular to an axis of the cable fixed on the positioning unit.

8. The assembly system of claim 1, wherein the supply unit includes a waste recovery box disposed under the cutting device and configured to recover waste generated during cutting.

9. The assembly system of claim 1, wherein the insertion unit includes a force sensor installed on the insertion device and configured to detect an insertion force of inserting the cable.

10. The assembly system of claim 9, wherein the insertion device is controlled to stop insertion when the insertion force detected by the force sensor is greater than a predetermined maximum insertion force or less than a predetermined minimum insertion force.

11. The assembly system of claim 1, wherein the first mounting base includes a first mounting plate on which the insertion device is slidably mounted.

12. The assembly system of claim 11, wherein the insertion unit includes a cylinder fixed on the first mounting plate and connected with the insertion device, the cylinder is configured to drive the insertion device to move on the first mounting plate in the horizontal direction to adjust a position of the insertion device in the horizontal direction.

13. The assembly system of claim 12, wherein the second mounting base includes a second mounting plate on which the first mounting plate is slidably mounted.

14. The assembly system of claim 13, wherein the insertion unit includes a driving device fixed on the second mounting plate and configured to drive the first mounting plate to move in a vertical direction perpendicular to the axis of the cable to adjust the position of the insertion device in the vertical direction.

15. An assembly system, comprising:
a positioning unit configured to clamp and position a cable;
a supply unit including a conveyor belt having a side to which ends of a plurality of connectors in a row of connectors are connected, a cutting device configured to cut each connector of the row of connectors from the conveyor belt, and a conveyor configured to move the conveyor belt, so as to move the connectors to the cutting device; and an insertion unit configured to insert an end of the cable into one of the connectors by moving the one connector, including:
 a gripper mounted on a first platform for inserting the end of the cable into the one connector by moving the gripper;
 a first actuator for moving the gripper in a horizontal direction parallel to an axis of the cable, the first actuator mounted on the first platform; and
 a second actuator for moving the first platform in a vertical direction.

16. The assembly system of claim 15, further comprising a second platform on which the first platform is slidably mounted.

17. The assembly system of claim 16, wherein the second actuator is fixed on the second mounting platform and configured to drive the first mounting platform to move in a vertical direction perpendicular to the axis of the cable to adjust the position of the insertion device in the vertical direction.

18. An assembly system, comprising:
 a positioning unit including a fixture configured to clamp and position a cable;
 a supply unit including a conveyor belt having a side to which ends of a plurality of connectors in a row of connectors are connected, a cutting device configured to cut each connector of the row of connectors from the conveyor belt, and a conveyor configured to move the conveyor belt so as to move the connectors to the cutting device, the conveyor belt moving in a direction generally normal to an axis of the cable clamped in the fixture; and
 an insertion unit configured to insert an end of the cable into one of the connectors by moving the one connector, the insertion unit arranged on a side of the conveyor belt opposite the positioning unit, the insertion unit comprising:
  a gripper configured to grip the one connector cut from the conveyor belt; and
  an insertion device configured to move the gripper for installing the connector over the cable, the insertion device configured to move the gripper in a horizontal direction parallel to an axis of the cable, the gripper is installed on the insertion device, the insertion device is configured to insert the end of the cable into the one connector by moving the gripper.

* * * * *